US006848879B2

(12) United States Patent
　　　Odorizzi

(10) Patent No.: US 6,848,879 B2
(45) Date of Patent: Feb. 1, 2005

(54) SELF-PROPELLED TRUCK FOR HANDLING AND TRANSPORTING BINS

(76) Inventor: Diego Odorizzi, 210, Via Trento, Cles (Trento) (IT)

( * ) Notice: Subject to any disclaimer, the term of this patent is extended or adjusted under 35 U.S.C. 154(b) by 0 days.

(21) Appl. No.: 10/353,513

(22) Filed: Jan. 29, 2003

(65) Prior Publication Data

US 2003/0143061 A1 Jul. 31, 2003

(30) Foreign Application Priority Data

Jan. 29, 2002 (IT) .......................................... TH2002A1

(51) Int. Cl.$^7$ ................................................ B60P 3/00
(52) U.S. Cl. ...................................... 414/459; 414/495
(58) Field of Search ................................. 414/459, 495

(56) References Cited

U.S. PATENT DOCUMENTS

| | | | | |
|---|---|---|---|---|
| 3,019,926 A | * | 2/1962 | Christenson | 414/459 |
| 3,184,087 A | * | 5/1965 | Prindle et al. | 414/459 |
| 3,381,833 A | * | 5/1968 | Gordon | 414/459 |
| 3,396,861 A | * | 8/1968 | Houlton | 414/459 |
| 3,606,053 A | * | 9/1971 | Whiteman | 414/739 |
| 3,891,107 A | * | 6/1975 | Burgess | 414/459 |
| 4,058,183 A | * | 11/1977 | Kroger | 180/89.1 |
| 4,500,248 A | * | 2/1985 | Kramer | 414/459 |
| 4,551,059 A | * | 11/1985 | Petoia | 414/459 |
| 4,897,011 A | * | 1/1990 | Brower | 414/459 |

FOREIGN PATENT DOCUMENTS

JP　　　　2-282196　　* 11/1990　................. 414/459

* cited by examiner

Primary Examiner—James R. Bidwell
(74) Attorney, Agent, or Firm—Orum & Roth

(57) ABSTRACT

A self propelled truck having as support chassis or frame (2), two pairs of wheels (3) arranged on opposite sides of support chassis (2), a steering device (4) and driving means for a pair of wheels (3) the support frame (2) comprises two longitudinal sides spaced from one other, each of which being supported by a respective pair of wheels (3), at least one pair of transverse members (13, 14) designed to rigidly bridge the two longitudinal sides of the truck and to delimit therewith a longitudinal tunnel, at least one lifting-lowering shaft (15) for a bin (7) between the longitudinal sides of the truck, lifting-lowering means (27, 48) carried by the support chassis (2) at each lifting-lowering shaft and displaceable between a fully lowered position and a fully lifted position, and removable engagement means (20, 25; 51, 52; 51a, 52a; 55) for a bin (7), which is rigidly displaceable with the lifting-lowering means (27; 48) and designed to engage a bin (7) on the ground at a lifting-lowering shaft and to hold it constrained to the lifting-lowering means (27; 48), driving means for the lifting-lowering means (27; 48) and the removable engagement means (20, 25; 51, 52; 51a, 52a; 55), and a control unit (35).

14 Claims, 4 Drawing Sheets

SELF-PROPELLED TRUCK FOR HANDLING AND TRANSPORTING BINS

BACKGROUND OF THE INVENTION

The present invention relates to a self-propelled truck for handling bins for picking fruit along rows of fruit trees and transporting them from an orchard to a harvest storehouse.

Various types of self-propelled bin-carrying truck for picking fruit in an orchard have already been proposed. In general, such trucks are provided with a front fork for lifting a bin from the ground and transferring it then to a loading platform of the truck, where it is in a handy position to receive fruit picked by pickers on board of the truck. The truck is also provided with a rear lowering fork arranged to lower bins filled with fruit from the loading platform to the ground, thereby making it possible for the front fork to lift one or more new empty bins to the loading platform in order to proceed with the fruit picking operation A serious drawback of such known trucks is that, in case empty or full bins have been placed or lie alongside a row of trees for any reason whatsoever, the truck cannot advance or in order to do it to advance, the truck must load and unload in sequence, all the bins on its path, which operation can be time-consuming and involve a great waste of energy to be completed.

Self-propelled truck equipped with a filling up device generally termed "automatic bin filler" have been widely used. An "automatic bin filler" substantially comprises one or more conveyor belts radially arranged about a fruit lowering head arranged above a bin to be filled. Each piece of fruit picked up by the personnel on the loading platform is placed on a conveyor belt which in turns transfers it to the lowering head to be loaded into the bin located under the lowering head. For a better satisfactory throughput the truck tows a trailer transporting a given number of empty bins that must be transferred sequentially onto the loading platform of the cart for being filled up.

This second type of truck, although making it possible to considerably reduce picking times, it has at least two serious shortcomings, i.e. it is of course much more expensive and cannot not be used in all circumstances, e.g. in hilly orchards as the conveyor belts operate well on flat land, whereas uphill they may fail to feed the pieces of fruit towards the lowering head, which means that the fruit may roll backwards and to get lost or damaged and downhill they may fail to hold the fruits in position, i.e. the fruit may be violently unloaded into the bin and be damaged.

SUMMARY OF THE INVENTION

A main object of the present invention is to provide a self-propelled truck structure for picking fruit in an orchard along rows of trees, that can handle empty bins and bins full of fruit, and advance along a row of trees even if one or more bins are found on its path.

Another object of the present invention is to provide a self-propelled truck structure suitable for being used even with an automatic bin filler, but with no need for a towed trailer.

A further object of the present invention is that said self-propelled truck structure is easy to use and handle, highly reliable and suitable for ensuring a high throughput in fruit picking.

These and other objects, which will become better apparent hereinafter are achieved by a self-propelled truck having a support chassis or frame comprising two longitudinal sides spaced from one other, at least one pair of side uprights and two respective longitudinal elements each designed to rigidly connect with a respective pair of uprights, as well as at least with said two longitudinal elements arranged to bridge said two truck sides and to delimit therewith at least one lifting-lowering shaft for a bin, two pairs of wheels arranged on opposite sides of said support chassis, a steering device and driving means for at least one wheel or pair of wheels at least one pair of transverse members designed to rigidly bridge the said two longitudinal sides and to delimit therewith a longitudinal tunnel, at least one lifting-lowering shaft for at least one bin between the said longitudinal sides, lifting-lowering means carried by said support chassis at each lifting-lowering shaft and displaceable between a fully lowered position and a fully lifted position, said lifting-lowering means comprising at least one carriage or slide at each side of said support chassis, said carriage or slide being slidably mounted along a respective pair of uprights, and at least one linear actuator designed to cause a respective carriage or slide to be displaced along a respective lifting-lowering shaft, removable engagement means for a bin, which is rigidly displaceable with said lifting-lowering means and designed to engage a bin on the ground at a lifting-lowering shaft and to hold it constrained to said lifting-lowering means driving means for said lifting-lowering means and said removable engagement means, and a control unit, and wherein said removable engagement means for engaging a bin comprises a section bar member or stirrup having a pair of wings extending normal to each other and pivoted about an articulation axis to a respective longitudinal element, a linear actuator for controlling said stirrup to angularly move a wing of said stirrup between a rest position substantially in alignment with said longitudinal element and a working position, in which said wing extends inside shaft.

Advantageously, the fully lifted position is at a higher level than the height of a bin.

BRIEF DESCRIPTION OF THE DRAWINGS

Further features and advantages of the present invention will become better apparent from the following detailed description of some of specific embodiments thereof, given by way of not limiting example only, with reference to the accompanying drawings, in which.

DETAILED DESCRIPTION OF THE PREFERRED EMBODIMENTS

Figure 1:
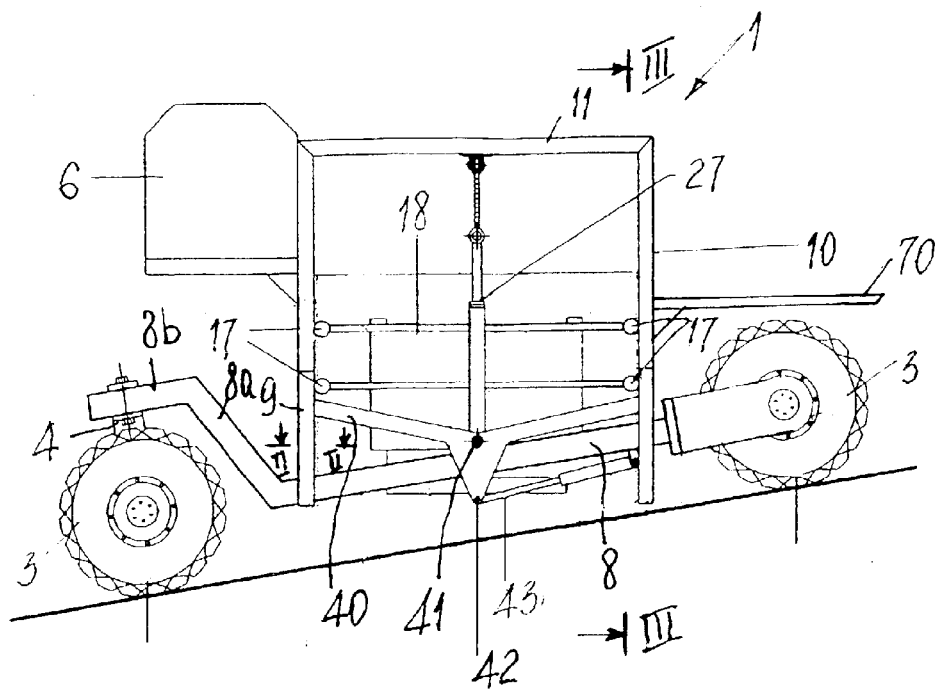
FIG. 1 is a diagrammatic top side view of a self-propelled truck according to the present invention.

In the accompanying drawings the same or similar parts or components have been indicated by the same reference numerals.

With reference first to FIGS. 1 to 7, it will be noted that a self-propelled truck or cart according to the present invention, generally designated at 1, is formed by a support chassis or frame 2 mounted on two pairs of wheels 3, preferably tired wheels, arranged on opposite sides of the support chassis 2, a steering device 4 (FIG. 4) of any suitable type, and driving means, e.g. comprising a hydraulic driving assembly 5 which is designed to drive one or both pairs of wheels 3 and received in a housing 6 located in an elevated position on the chassis 2.

More particularly, the support chassis 2 comprises two longitudinal sides spaced from each other for a width slightly greater than the width of a standard bin 7 (FIGS. 3 and 11) that truck 1 is designed to handle and transport. Each longitudinal side comprises at least one main longitudinal metal member 8, preferably of tubular structure (FIGS. 1 and 2), which can have, at one of its ends an inclined portion 8a extending uphill, in use, e.g. extending to a level higher than the diameter of wheels 3 and, at its other end a transverse portion 8c extending outwards over a respective wheel 3, followed by a longitudinal portion parallel to the body of the longitudinal member to which a wheel 3 is pivoted. Between the sections 8a and 8b of the two longitudinal members the steering device 4 is located, which can be controlled by a control steering column driven by a wheel or a crank in any suitable way.

Figure 2:
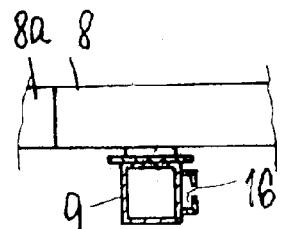
FIG. 2 is a cross-sectional view taken along line IV—IV in FIG. 1.

A pair of side uprights 9 and 10, preferably tubular in structure, rise from each longitudinal member 8, preferably with a square cross-section as shown in in FIG. 2. Uprights 9 and 10 are rigidly connected, e.g. welded, to two respective longitudinal member 11 and 12 which are in turn rigidly connected at their ends to respective transverse elements 13 and 14 (FIG. 4), thereby rigidly bridging the two sides of the truck and delimiting therewith a longitudinal tunnel extending throughout the length of the truck. Between the longitudinal elements 11 and 12 and the transverse members 13 and 14 a lifting-lowering shaft 15 for a bin 7 is delimited as further explained below.

Figure 3:
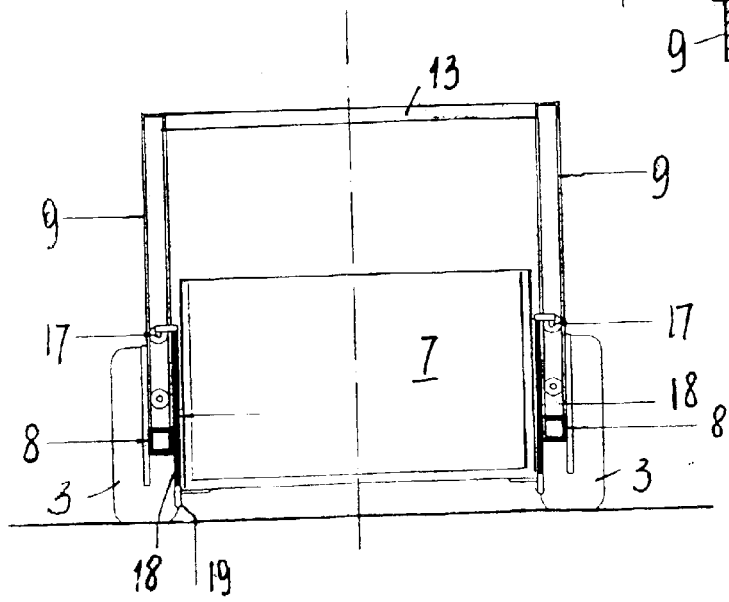
FIG. 3 shows a cross-sectional view on a vertical plane taken along line III—III of FIG. 1.
Figure 5:
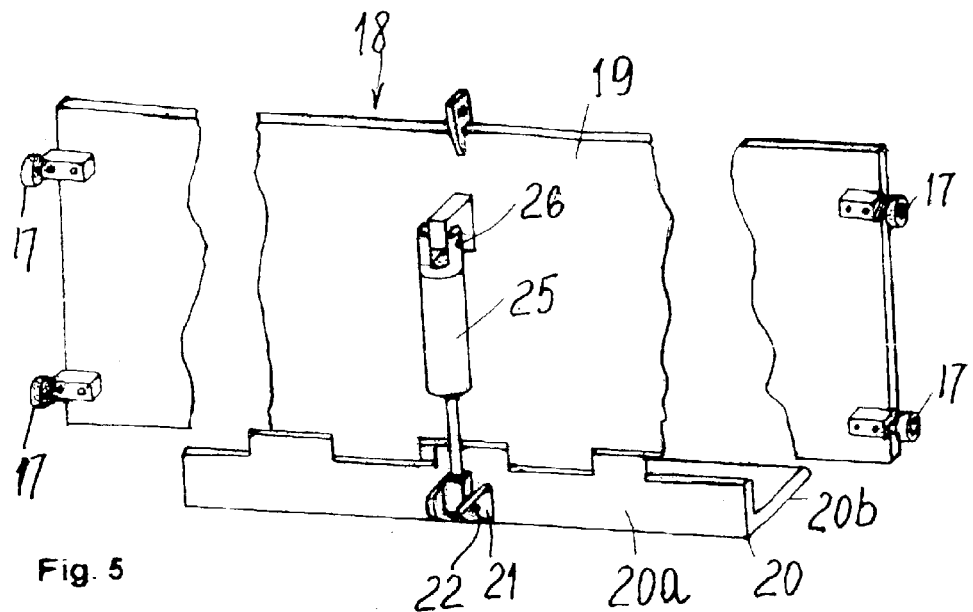
FIG. 5 shows a diagrammatic perspective view of a detail on an enlarged scale of FIGS. 3 and 4.

As better illustrated in FIGS. 2 and 3, each upright of the two pairs of tubular uprights 9 and 10 delimits, on its side facing the other upright, a longitudinal sliding guide 16 in which either a shoe or a pair of rollers 17 can roll, that are part of their respective carriage 18 which is thus slidable along its respective upright 9, 10. The two carriages 18 located on the same side of the truck are rigidly connected to each other by a lower longitudinal element 19 which supports suitable means for releasably engaging a bin 7 placed at shaft 15. As shown in FIG. 5, the engagement means can comprise a section bar or stirrup 20, one wing 20a of which is pivoted about a horizontal articulation axis to its respective longitudinal member 19. The stirrup 20 is articulated on its rear side to one end of a linear actuator, e.g. an oil operated jack 25, by means of two lugs 21 supporting a pin 22. The other end of jack 25 is articulated at 26 to the lower longitudinal element 19, so that when the jack is extended, the wing 20a of the stirrup 20 is arranged in substantial alignment with the longitudinal element, whereas when it is retracted, the wing 20a extends into shaft 15 underneath bin 7 located in the shaft 15 and the other fin 20b of the stirrup is moved in substantial alignment with the longitudinal element 19.

On each side of the truck a respective oil operated cylinder 27 is also provided, acting as a means for lifting-lowering a carriage 18. To this end, cylinder 27 has its lower end articulated to its respective carriage 18 and its upper end articulated to a longitudinal member 11, 12. According to another embodiment, each oil operated cylinder 27 has its lower end secured to its respective longitudinal member 8 (FIG. 7) and its other end constrained to one end of a rope or chain 28 wound around a pulley 29 carried by a longitudinal member 11, 12, the other end of the rope 28 being connected to a carriage 18.

With an arrangement as described above, each carriage 18 can be moved along one side of the shaft 15 and stopped formed in the shaft at a predetermined level and then further lifted or lowered according to the specific requirements. Once the truck 1 has been displaced so that its shaft 15 is brought at a bin 7, above which the truck 1 can be freely moved since the space between the sides of the truck is fully clear throughout the tunnel from any obstacle, jacks 25 are first energized in a way that will be further explained below, so that the stirrups are brought to their working positions, i.e. with their fins 20b overhangingly extending below bin 7 so that when jacks 27 are subsequently actuated, they engage the bin 7 from below, thereby lifting it, e.g. to a level slightly higher than the standard height of the bins 7, and thus truck 1 can move forward with a bin loaded on it, even above other bins 7 on the ground along its path.

In order to drive the various parts of truck 1, housing 6 locates a pump 30 for driving gears 3 and a pump 31 for lifting the carriages 18. The two pumps 30 and 31 are connected to a hydraulic circuit comprising an oil tank 3 provided with a filter 33 (FIG. 4) and can be powered either by an electric engine fed by an electric battery 34 or by a thermal motor of any suitable type. The whole assembly is controlled by an electronic control unit 35. Preferably, various controls available to the operator are arranged together in a control panel, not shown in the drawings, which can be located in any suitable position on trick 1, e.g. on one side of housing 6.

In the embodiment shown in FIG. 1, each truck side instead of being rigidly fixed to its respective longitudinal member 8, is pivoted to a horizontal pin 40 by means of an auxiliary longitudinal member 41 shaped as a three armed balance, which is rigidly fixed to the two uprights 9 and 10, respectively, at the end of two arms thereof, whereas the end of its third arm is articulated at 42 to an oil operated jack 43, the other end of which is fixed to a longitudinal member 8 in any suitable way. Jack 43 is connected to the hydraulic circuit of the truck and it is controlled by the electronic control unit 35, in turn, controlled by an inclination measuring device of any suitable type, not shown, so as to hold the truck sides, and thus the load constituted by one or more bins carried by it, in a substantially vertical attitude.

Advantageously, truck 1 can be provided with side platforms 45 (FIGS. 4 and 6), preferably of a collapsible type, i.e. overturning against its side, and with a parapet 46, also preferably overturning, to allow the picker personnel to safely stand on the truck 1.

Figure 9:
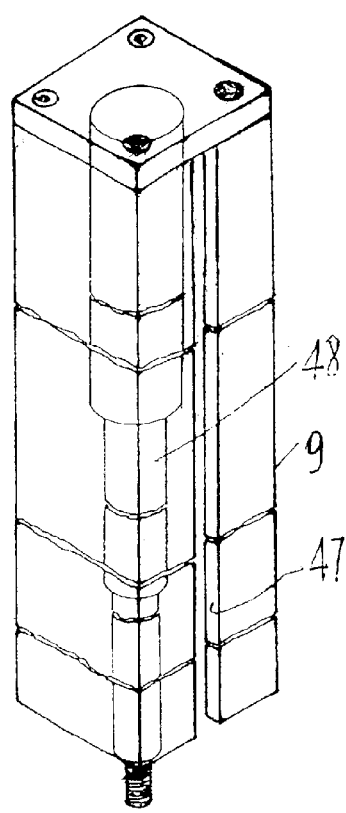
FIG. 9 shows an axonometric view on an enlarged scale of a detail of FIG. 7.
Figure 10:
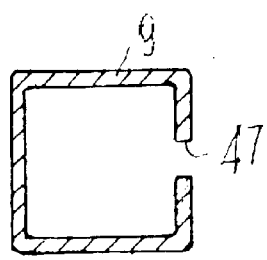
FIG. 10 is a cross-sectional view of the detail of FIG. 8 some parts of which have been removed.
Figure 8:
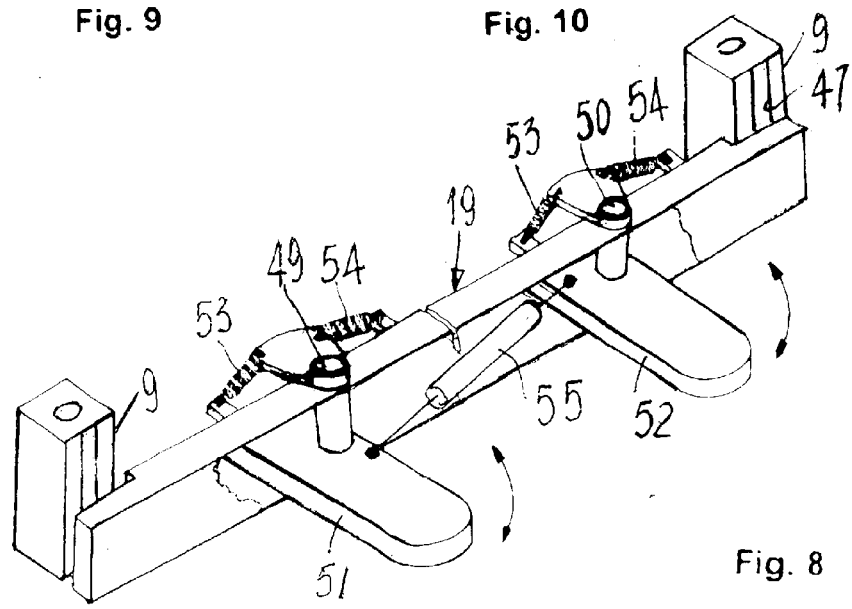
FIG. 8 shows a perspective view of another embodiment of a removable bin engagement means.

Moreover, according to the embodiment shown in FIGS. 8 to 10, uprights 9 and 10 are tubular in shape with a C-shaped (square) cross-section, as shown in FIG. 10, and are provided with a longitudinal slot 47. Within each upright 9 and 10 a respective oil operated jack 48 is housed which has one end, e.g. its upper end fixed to the end of its respective upright 9, 10 (FIG. 9) and its other end is constrained to one end of a lower longitudinal element 19, e.g. through a bracket not shown in the drawings, which advantageously consists of a tubular member (FIG. 8). Each time the two jacks 48 of each pair of uprights 9 and 10 are retracted or extended, their respective longitudinal element 19 will be lifted or lowered accordingly, thereby acting as a carriage 18.

To this end, a pair of flat brackets 51 and 42 are pivoted about a vertical pin 49 and 50, respectively, and can thus be angularly displaced either in their working position facing towards shaft 15 or aligned with the longitudinal element 19 in their rest position.

Advantageously, each bracket 51 and 52 is resiliently loaded, e.g. by a pair of helical springs 53, 54 designed to hold their respective bracket in its working position, as shown in FIG. 8. Each pair of brackets 51, 52 can be controlled by a two piston oil operated jack 55 having its ends articulated to a respective bracket and controlled by the control panel. Preferably the jack 55 is arranged in its respective longitudinal element 19 as diagrammatically shown in FIG. 8. Brackets 51 and 52, however, can be controlled by any other suitable control means.

Figure 11:
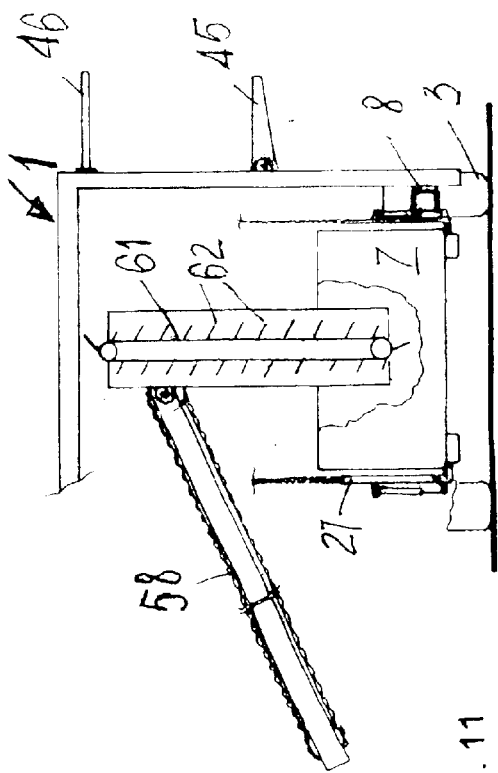
FIG. 11 is a diagrammatic cross-section view along a vertical plane illustrating a truck according to the present invention provided with an automatic bin filler device.
Figure 12:
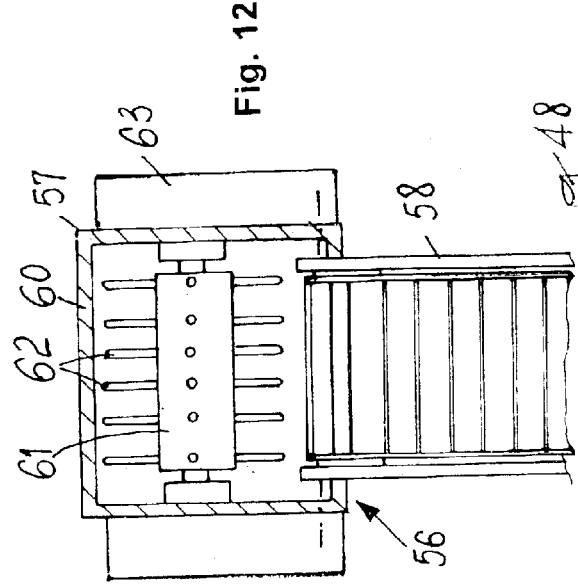
FIG. 12 shows a partial top view of the filling device of FIG. 11 some parts of which have been removed.

In the embodiment shown in FIGS. 11 and 12 a self-propelled truck 1 according to the invention is shown, which is provided with an automatic bin filler 56 which, is structured as a conventional bin filler, since although being provided with a bin feeding head 57 and one or more conveyor belts 58 radially arranged around it, it has a fixed type head, i.e. the height of the bin feeding head is not adjustable, as with conventional automatic filler devices, as the adjustment of the height from which fruit falls into a bin 7 carried in the shaft 15 is effected by suitably actuating jacks 27, e.g. by means of a feeler pin sensor 59 located at the lower portion of head 57 and designed to generate an output signal to the electronic control unit 35 that in turn will process a control signal for the jacks 27 to adjust the bin height according to requirements.

More particularly head 57 can consist of a tubular body 60 arranged (e.g. hanging) vertically above a bin 7 (FIG. 11) and within which a sector or stake conveyor 61 (FIG. 12) is arranged to receive fruit from conveyor(s) 58 and guide it to bin 7 lying underneath. Advantageously, the conveyor belts 58 and the upright conveyor 61 can be driven by the same power source, e.g. a suitable electrically powered motor (not shown in the drawings), the motion of one conveyor being synchronously transmitted to the other, e.g. by means of a suitable gear drive generally designated at 63.

It will be easily understood from the above description that a self-propelled truck 1 according to the present invention allows a bin 7 to be automatically loaded and handled by lifting or lowering it at its shaft 15 according to requirements both for overtaking one or more bins lying on the truck path and for adjusting the level thereof as the bin is loaded with an increasing amount of material (fruit).

The self-propelled truck described above is susceptible to numerous modifications and variations within the scope of the present invention as defined by the claims.

Thus, as shown in FIG. 1, a bin supporting surface 70 can be provided, which is positioned on the side opposite to the housing 6 with respect to the lifting-lowering shaft 15 and designed to receive an empty or full bin from shaft 15. The unloading surface 70 can comprise e.g. a, preferably motorised roller assembly for easily transferring a bin to it and from it. The height above ground of the surface 70 level must be slightly higher than that of a bin lying on the ground, so that the truck 1 can handle more than one bin. For example, with a self-propelled truck according to the present invention one or more bins lying on the ground can be overtaken even if truck 1 is loaded with a bin lying on the unloading surface 70, and possibly with a bin kept lifted from the ground in shaft 15.

Figure 4:
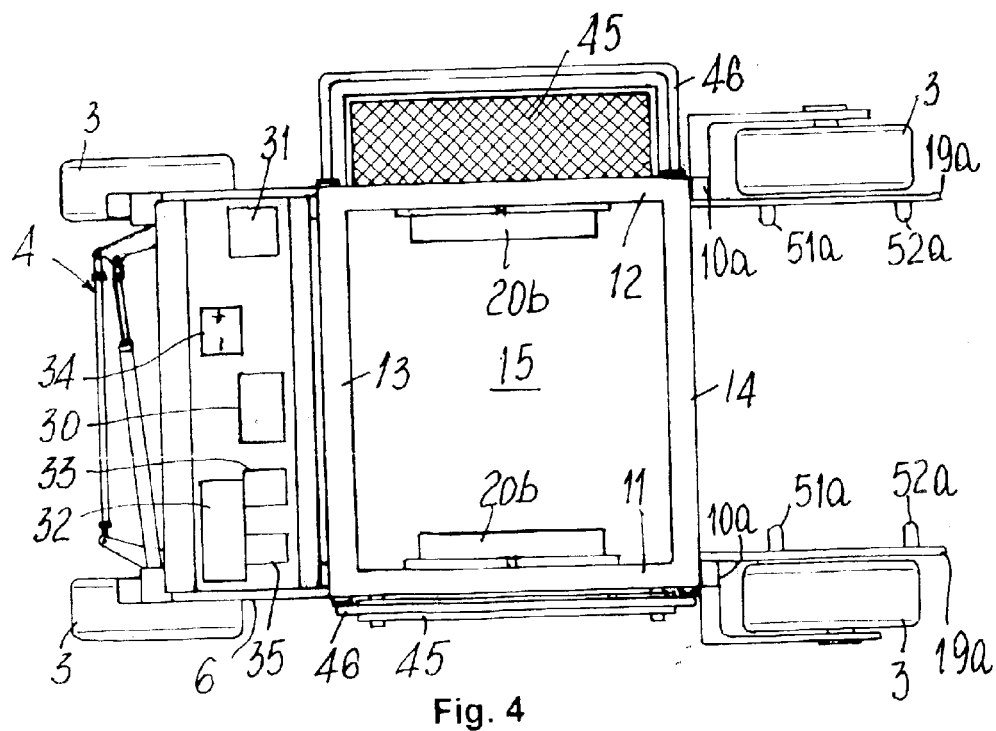
FIG. 4 is a diagrammatic perspective top plan view on an enlarged scale of the truck of FIG. 1.
Figure 6:
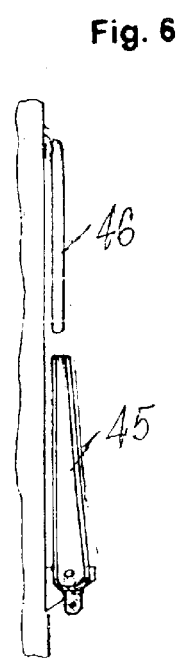
FIG. 6 is a partly diagrammatic elevation side view of a portion of the side of the truck shown in FIG. 4.
Figure 7:
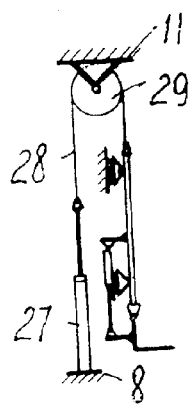
FIG. 7 illustrates a general constructional diagram of the bin lifting and lowering means.
Figure 13:
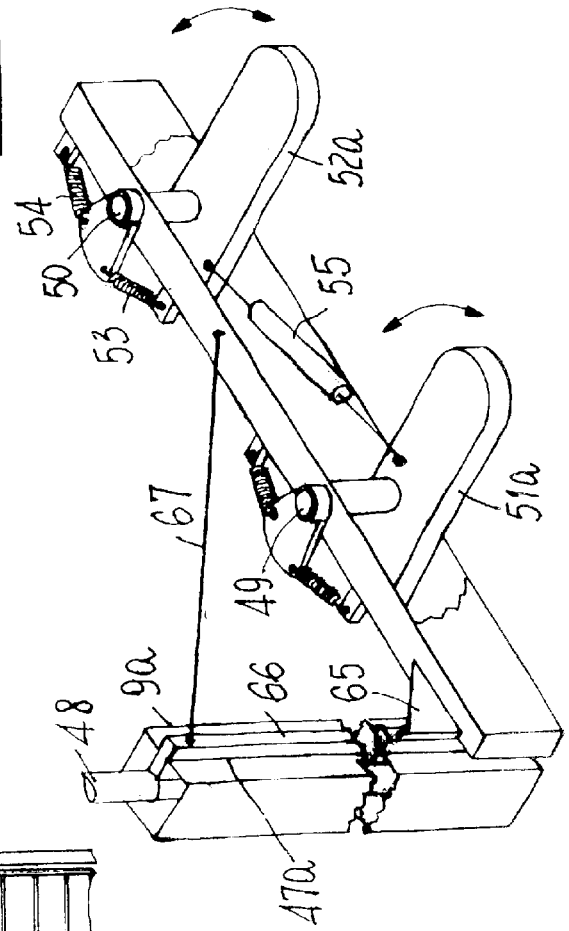
FIG. 13 is a perspective view of another embodiment of the engagement means of FIG. 8 acting as an additional lifting-lowering means.

FIGS. 4 and 13 show the lifting-lowering system illustrated in FIGS. 8 to 10 which can be advantageously used for constituting a lifting-lowering means for bins 7 located in place of the supporting surface 70. More particularly, on the side of each of the uprights 10 a tubular upright 10a is provided in which a respective oil operated jack is located designed to lift a longitudinal overhanging element 19a having lower brackets 51a and 52a similar and acting in the same way as brackets 51 and 52. The longitudinal element 19a is secured to the lower end of jack 48, e.g. through a gusset plate 65 slidably guided in and along a longitudinal slit 47a in the upright 10a. If desired, the gusset plate 65 can be strengthened by means of a shim 66 to which one end of a tension rod 67 can be secured, the other end of the tension rod being anchored to the end portion of the longitudinal element 19a.

As better shown in FIG. 4, when a bin is located between two longitudinal elements 19a at two wheel of the truck 1, it can be engaged on two opposite sides by the two pairs of brackets 51a and 52a and can be lifted and lowered similarly to a bin in the shaft 15.

Of course, driving of the various movable elements can be of fluid operated, or electrical or mechanical type and motion can be transmitted, e.g. by means of worm screw, mechanical jacks, or any other suitable transmission means.

Moreover, besides being controllable by the control panel, truck 1 can be remote controlled by any suitable type of remote control.

The materials used as well as the dimensions thereof can vary according to the specific requirements.

What is claimed is:

1. A self propelled truck having
    a support chassis or frame comprising two longitudinal sides spaced from one other, at least one pair of side uprights and two respective longitudinal elements each designed to rigidly connect with a respective pair of uprights, as well as at least with said two longitudinal elements arranged to bridge said two truck sides and to delimit therewith at least one lifting-lowering shaft for a bin,
    two pairs of wheels arranged on opposite sides of said support chassis, a steering device and driving means for at least one wheel or pair of wheels
    at least one pair of transverse members designed to rigidly bridge the said two longitudinal sides and to delimit therewith a longitudinal tunnel, at least one lifting-lowering shaft for at least one bin between the said longitudinal sides, lifting-lowering means carried by said support chassis at each lifting-lowering shaft and displaceable between a fully lowered position and a fully lifted position, said lifting-lowering means comprising at least one carriage or slide at each side of said support chassis, said carriage or slide being slidably mounted along a respective pair of uprights, and at least one linear actuator designed to cause a respective carriage or slide to be displaced along a respective lifting-lowering shaft, and removable engagement means for a bin which is rigidly displaceable with said lifting-lowering means and designed to engage a bin on the ground at a lifting-lowering shaft and to hold it constrained to said lifting-lowering means, driving means for said lifting-lowering means and said removable engagement means, and a control unit, and wherein said removable engagement means for engaging a bin comprises a section bar member or stirrup having a pair of wings extending normal to each other and pivoted about an articulation axis to a respective longitudinal element, a linear actuator for controlling said stirrup to angularly move a wing of said stirrup between a rest position substantially in alignment with said longitudinal element and a working position, in which said wing extends inside shaft.

2. A truck according to claim 1, wherein the said releasable engagement means for engaging a bin comprises a pair of brackets pivoted to their respective longitudinal member thereby being be angularly displaceable between a working position extending within a lifting-lowering shaft and a rest position in alignement with its respective longitudinal element, and a linear actuator for each pair of brackets.

3. A truck according to claim 2, wherein each bracket is resiliently loaded by at least one return spring.

4. A truck according to claim 1, wherein each truck side is pivoted to a respected longitudinally extending member about a transverse pivotal pin through an auxiliary longitudinal three-armed member, having two ends thereof to a respective upright, whereas the end of its third arm is articulated to one end of a linear actuator whose other end is pivoted to said longitudinally extending member, the said linear actuator being controlled by said electronic control unit, in turn controlled by an inclination gauge.

5. A truck according to claim 1, comprising an automatic bin filler comprising a lowering conveyor head not adjustable in height, at least a conveyor belt suitable for conveying to the said conveyor head, and driving means for said conveyor head and said at least one conveyor belt.

6. A truck according to claim 5, wherein the said conveyor head comprises a tubular body arranged to be located above said bin placed in a lifting-lowering shaft, a sector or stake conveyor located in said tubular body and a sensor designed to detect the distance of the material loaded in a bin and said tubular body to control said lifting-lowering means.

7. A truck according to claim 1, comprising a support plane for a bin, said support plane being arranged adjacent to a lifting-lowering shaft to receive a bin from the shaft at a level slightly further up above the ground than that of the bin.

8. A truck according to claim 7, wherein the said support plane comprises a roller assembly.

9. A self propelled truck having as support chassis or frame, two pairs of wheels arranged on opposite sides of said support chassis, a steering device and driving means for at least one wheel or pair of wheels wherein the said support frame comprises two longitudinal sides spaced from one other, each of which being supported by a respective pair of wheels, at least one pair of transverse members designed to rigidly bridge the said two longitudinal sides and to delimit therewith a longitudinal tunnel, at least one lifting-lowering shaft for at least one bin between the said longitudinal sides, lifting-lowering means carried by said support chassis at each lifting-lowering shaft and displaceable between a fully lowered position and a fully lifted position, and removable engagement means for a bin, which is rigidly displaceable with said lifting-lowering means and designed to engage a bin on the ground at a lifting-lowering shaft and to hold it constrained to said lifting-lowering means, driving means for said lifting-lowering means and said removable engagement means, and a control unit, wherein the said support chassis comprises two longitudinal sides spaced from one other, each of which comprises at least one longitudinally extending member, at least one pair of side uprights and two respective longitudinal elements each designed to rigidly connect with a respective pair of uprights, as well as at least with said two longitudinal elements arranged to bridge said two truck sides and to delimit therewith at least one lifting-lowering shaft for a bin, the said lifting-lowering means comprises at least one carriage or slide at each side of said support chassis, said carriage or slide being slidably mounted along a respective pair of uprights, at least one linear actuator designed to cause a respective carriage or slide to be displaced along a respective lifting-lowering shaft and the said removable engagement means for engaging a bin comprises a section bar member or stirrup having a pair of wings extending normal to each other and pivoted about an articulation axis to a respective longitudinal element, a linear actuator for controlling said stirrup to angularly move a wing of said stirrup between a rest position substantially in alignment with said longitudinal element and a working position, in which said wing extends inside shaft.

10. A self propelled truck having as support chassis or frame, two pairs of wheels arranged on opposite sides of said support chassis, a steering device and driving means for at least one wheel or pair of wheels wherein the said support frame comprises two longitudinal sides spaced from one other, each of which being supported by a respective pair of wheels, at least one pair of transverse members designed to rigidly bridge the said two longitudinal sides and to delimit therewith a longitudinal tunnel, at least one lifting-lowering shaft for at least one bin between the said longitudinal sides, lifting-lowering means carried by said support chassis at each lifting-lowering shaft and displaceable between a fully lowered position and a fully lifted position, and removable engagement means for a bin, which is rigidly displaceable with said lifting-lowering means and designed to engage a bin on the ground at a lifting-lowering shaft and to hold it constrained to said lifting-lowering means, driving means for said lifting-lowering means and said removable engagement means, and a control unit, wherein the said support chassis comprises two longitudinal sides spaced from one other, each of which comprises at least one longitudinally extending member, at least one pair of side uprights and two respective longitudinal elements each designed to rigidly connect with a respective pair of uprights, as well as at least with said two longitudinal elements arranged to bridge said two truck sides and to delimit therewith at least one lifting-lowering shaft for a bin, the said lifting-lowering means comprises at least one carriage or slide at each side of said support chassis, said carriage or slide being slidably mounted along a respective pair of uprights, at least one linear actuator designed to cause a respective carriage or slide to be displaced along a respective lifting-lowering shaft, and the said releasable engagement means for engaging a bin comprises a pair of brackets pivoted to their respective longitudinal member thereby being be angularly displaceable between a working position extending within a lifting-lowering shaft and a rest position in alignment with its respective longitudinal element, and a linear actuator for each pair of brackets.

11. A truck according to claim 10, wherein each bracket is resiliently loaded by at least one return spring.

12. A self propelled truck having as support chassis or frame, two pairs of wheels arranged on opposite sides of said support chassis, a steering device and driving means for at least one wheel or pair of wheels wherein the said support frame comprises two longitudinal sides spaced from one other, each of which being supported by a respective pair of wheels, at least one pair of transverse, members designed to rigidly bridge the said two longitudinal sides and to delimit therewith a longitudinal tunnel, at least one lifting-lowering shaft for at least one bin between the said longitudinal sides, lifting-lowering means carried by said support chassis at each lifting-lowering shaft and displaceable between a fully lowered position and a fully lifted position, and removable engagement means for a bin, which is rigidly displaceable with said lifting-lowering means and designed to engage a bin on the ground at a lifting-lowering shaft and to hold it constrained to said lifting-lowering means, driving means for said lifting-lowering means and said removable engagement means, and a control unit, wherein the said support chassis comprises two longitudinal sides spaced from one other, each of which comprises at least one longitudinally extending member, at least one pair of side uprights and two respective longitudinal elements each designed to rigidly connect with a respective pair of uprights, as well as at least with said two longitudinal elements arranged to bridge said two truck sides and to delimit therewith at least one lifting-lowering shaft for a bin, and each truck side is pivoted to a respected longitudinally extending member about a transverse pivotal pin through an auxiliary longitudinal three-armed member, having two ends thereof to a respective upright, whereas the end of its third arm is articulated to one end of a linear actuator whose other end is pivoted to said longitudinally extending member, the said linear actuator being controlled by said electronic control unit, in turn controlled by an inclination gauge.

13. A self propelled truck having as support chassis or frame, two pairs of wheels arranged on opposite sides of said support chassis, a steering device and driving means for at least one wheel or pair of wheels wherein the said support frame comprises two longitudinal sides spaced from one other, each of which being supported by a respective pair of wheels, at least one pair of transverse members designed to rigidly bridge the said two longitudinal sides and to delimit therewith a longitudinal tunnel, at least one lifting-lowering shaft for at least one bin between the said longitudinal sides, lifting-lowering means carried by said support chassis at each lifting-lowering shaft and displaceable between a fully lowered position and a fully lifted position, and removable engagement means for a bin, which is rigidly displaceable with said lifting-lowering means and designed to engage a bin on the ground at a lifting-lowering shaft and to hold it constrained to said lifting-lowering means, driving means for said lifting-lowering means and said removable engagement means, a control unit and an automatic bin filler comprising a lowering conveyor head not adjustable in height, at least a conveyor belt suitable for conveying to the said head, and driving means for said conveyor head and at least one conveyor belt.

14. A truck according to claim 13, wherein the said conveyor head comprises a tubular body arranged to be located above said bin placed in a lifting-lowering shaft, a sector or stake conveyor located in said tubular body and a sensor designed to detect the distance of the material loaded in a bin and said tubular body to control said lifting-lowering means.

* * * * *